United States Patent [19]
Wiley et al.

[11] 4,409,280
[45] Oct. 11, 1983

[54] DECORATIVE SURFACE COVERINGS

[75] Inventors: John W. Wiley, Woodstown; Charles H. Brower, Salem, both of N.J.; David Wang, Wilmington, Del.

[73] Assignee: Mannington Mills, Salem, N.J.

[21] Appl. No.: 304,164

[22] Filed: Sep. 21, 1981

[51] Int. Cl.³ .......................... B32B 3/00; B32B 7/14
[52] U.S. Cl. .................................... 428/203; 428/159; 428/160; 428/172; 428/204; 428/207; 428/208; 428/215
[58] Field of Search ............... 428/159, 160, 203, 204, 428/172, 207, 208, 215

[56] References Cited
U.S. PATENT DOCUMENTS 3,560,322  2/1971  Magid .................................. 428/160
4,126,727  11/1978  Kaminsky ............................ 156/79

Primary Examiner—Bruce H. Hess
Assistant Examiner—P. Schwartz
Attorney, Agent, or Firm—John H. Bain; Louis E. Marn; Paul H. Kochanski

[57] ABSTRACT

There is disclosed a process for manufacturing surface coverings including the steps of printing a design on a base layer; overlying the printed base layer with a coating of substantially transparent or translucent material; printing a subsequent design using an ink including decorative particles on such transparent or translucent overlying material; and overlaying the ink printed design with a substantially transparent or translucent material prior to subsequent processing, such as heat curing to ensure an effectively fused product of the resulting surface covering. The present invention may include the required processing steps of chemical or mechanical embossing as more clearly hereinafter described.

7 Claims, 3 Drawing Figures

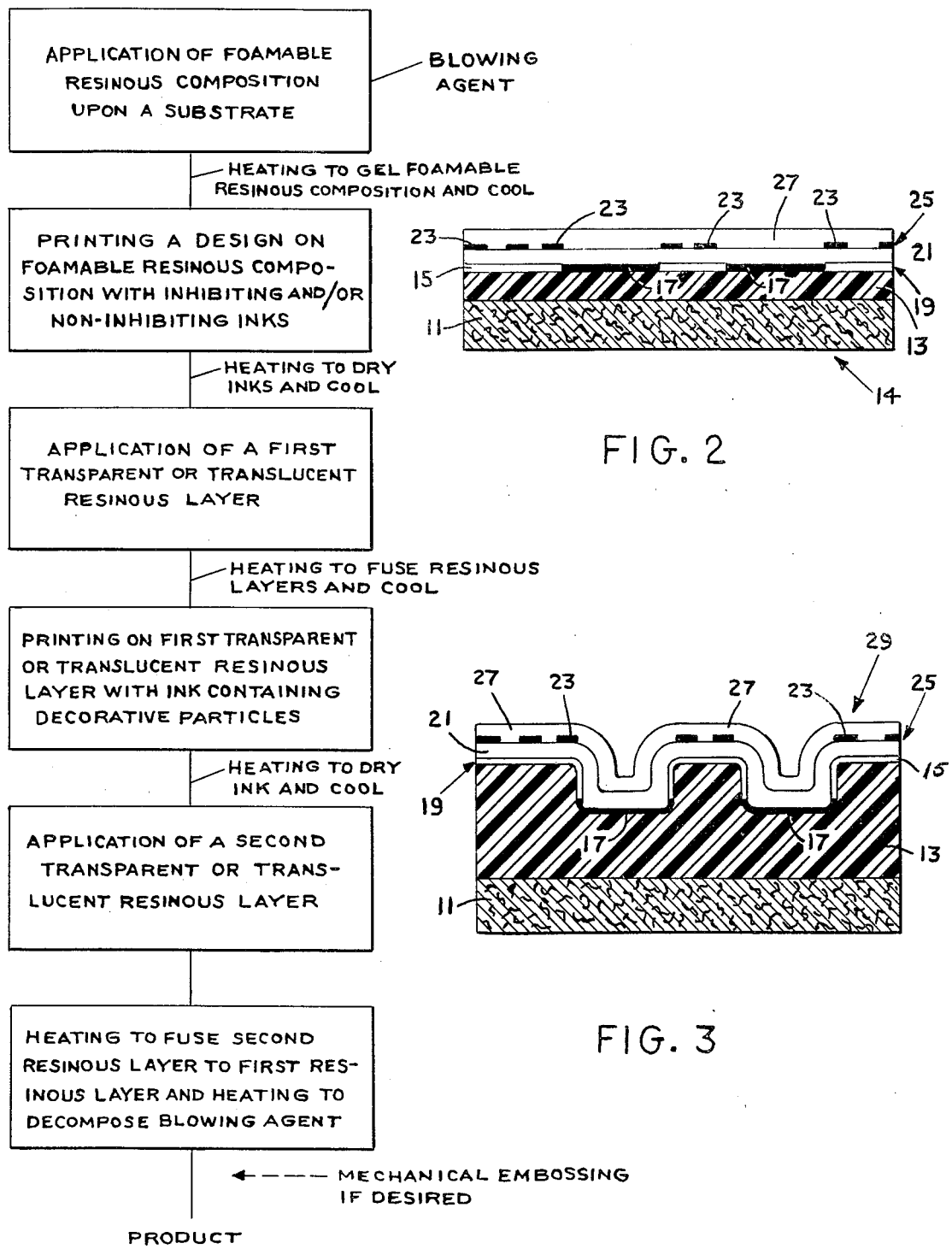

DECORATIVE SURFACE COVERINGS

FIELD OF INVENTION

This invention relates to decorative surface coverings, and more particularly to decorative surface coverings having embossed surfaces for use as floor, wall and ceiling coverings, desk, table and counter tops; surface layers on leather, fabrics, paper, wood, metals, glass, etc; upholstery, drapery, and clothing materials; interiors for cars, trucks, boats, airplanes, and other means of transportation; covers for books and other publications; and like articles.

BACKGROUND OF THE INVENTION

Decorative surface coatings have been manufactured for many years. In U.S. Pat. No. 3,660,187 to Shortway et. al, there are disclosed processes for incorporating small decorative chips or flakes of various colors and hues in the wear layer of a floor covering. These relatively small decorative chips or flakes of various hues and colors are included and are present substantially uniformly visible or discernible by persons viewing the resilient floor covering. When a pattern or design is provided in the resilient floor covering, the relatively small decorative chips or flakes of various colors and hues are visible and discernible in substantially all parts of the pattern or design. And, if the resilient floor covering is of the embossed type, whether chemically embossed, mechanically embossed, or otherwise, the relatively small decorative chips or flakes are visible and discernible in both the raised and depressed portions of the resilient embossed floor covering.

This substantially uniform appearance of the eye-catching, relatively small decorative particles, chips or flakes is normally not undesirable or objectionable but sometimes there are occasions when it is desired that the decorative particles, chips or flakes be limited or confined to certain selected portions of the pattern or design, or to certain raised or depressed portions, if an embossed or textured type of resilient floor covering is involved. This is rather difficult to accomplish, inasmuch as the easiest and most economical way to include the decorative chips or particles in the product is simply to incorporate such decorative chips or particles in the formulation of the wearlayer whereby such decorative chips or particles become substantially uniformly dispersed during the mixing of the formulation subsequently applied to the main portion of the resilient floor covering.

In U.S. Pat. No. 4,126,727 to Kaminski, there are disclosed processes for overcoming the problems of the visible and discernible particles, chips or flakes in all parts of the pattern or design wherein the relatively small, eye-catching decorative particles, chips or flakes of various colors and hues may be incorporated substantially uniformly in the wearlayer during formulation and mixing, but wherein such relatively small, eye-catching decorative particles, chips or flakes are discernible or visible only in those portions where it is desired to be discernible or visible and be indiscernible or invisible in those other portions where their appearance is not desired or required.

Such processes included the uniform distribution of decorative particles, chips or flakes, over the full surface area and thus excessive decorative particles requirements for any design. Additionally, the latter disclosure demanded excess processing requirements, i.e. extrusion of a sheet of a blend of decorative particle in a resinous base followed by granulation of the thus formed sheet prior to blending such granulated particles in another resinous base preparatory to extrusion or calendaring of a sheet of the blended granulated particles for overlying a gelled printed foamable resinous polymer composition.

OBJECTS OF THE INVENTION

An object of the present invention is to provide a novel process for forming decorative surface coverings.

Another object of the present invention is to provide a novel process for forming decorative surface coverings permitting of reduced decorative particle requirements.

Still another object of the present invention is to provide a novel process for forming decorative surface coverings of improved three dimensional aesthetic effects.

A further object of the present invention is to provide a novel process for forming decorative surface coverings of simplified processing requirements.

A still further object of the present invention is to provide a novel process for forming decorative surface coverings permitting of decorative designs of more closely registered sequences.

Yet another object of the present invention is to provide a novel process for forming decorative surface coverings permitting of substantially improved production rates.

Yet another object of the present invention is to provide a novel decorative surface covering.

SUMMARY OF THE INVENTION

These and other objects of the present invention are achieved in a process for manufacturing surface coverings including the steps of printing a design on a base layer; overlying the printed base layer with a coating of substantially transparent or translucent material; printing a subsequent design using an ink including decorative particles on such transparent or translucent overlying material; and overlaying the ink printed design with a substantially transparent or translucent material prior to subsequent processing, such as heat curing to ensure an effectively fused product of the resulting surface covering. The present invention may include the required processing steps of chemical or mechanical embossing as more clearly hereinafter described.

DESCRIPTION OF THE DRAWING

Other objects and advantages of the present invention will become apparent by reference to the following detailed description of an embodiment thereof when taken in conjunction with the accompanying drawing, in which:

FIG. 1 is a flow diagram of an embodiment of the process of the present invention;

FIG. 2 is a fragmentary cross-sectional view of an intermediate product of the process of the present invention; and FIG. 3 is a fragmentary cross-sectional view of a final product of the process of the present invention.

De

FIGS. 2 and 3 have not been drawn precisely to exact scale. Some portions thereof have been drawn to a slightly larger scale, whereas certain other portions thereof have been drawn to a slightly smaller scale. This has been done to amplify more clearly the details of the smaller portions and to accentuate some of the more important features of the present invention.

DETAILED DESCRIPTION OF THE INVENTION

Although the present invention relates to decorative surface coverings encompassing floor, wall and ceiling coverings and the like, the following detailed description relates to a preferred embodiment of the present invention related to embossed sheet vinyl floor coverings. Methods of achieving embossed sheet vinyl floor covering include chemical embossing by the use of the hereinabove discussed known printing techniques to produce a printed design, or silk screen method of applying different plastisols to produce an inlaid design.

FIG. 1 illustrates the stepwise processing procedures of manufacturing chemically embossed sheet vinyl flooring of the present invention. In producing chemically embossed sheet vinyl floor covering a relatively flat, backing sheet material 11 is employed as the base portion of the product. Normally such backing sheet material 11 may be a felted or matted fibrous sheet; a non-woven or woven constructed fabric; a release paper; or like sheet materials. Fibrous sheet materials comprising inorganic fibers, such as asbestos; or organic fibers, such as cellulose; or synthetic or man-made fibers and/or filaments, such as non-woven fiberglass, are the most popular backing sheet materials, but many others are suitable and utilizable, and are set forth in the previously cited U.S. Patent and in the references to be hereinafter cited. To overcome problems of porosity, absorbency and dimensional stability, a sizing coat and a barrier coat, such as vinyl plastisol dispersion; paint, such as organic solvent or latex base; lacquer or the like, may be applied to the backing sheet material 11 as shown in FIG. 2.

Following the preparation of the backing sheet material 11, a foamable resinous composition layer is then applied. The formulation and preparation of the foamable resinous composition as known in the art and are dependent on the type of product to be produced. For chemically embossed vinyl sheet floor covering, the foamable resinous composition contains portions of many constituents. For example, synthetic resin, such as a polymer or a co-polymer of vinyl chloride; a blowing or foaming agent, such as azodicarbonamide; various accelerators or catalysts, such as dibasic lead phosphate or zinc oxide, to lower the decomposition temperature of the blowing or foaming agent or to narrow the decomposition temperature range; stabilizers to reduce the harmful effects of degradation due to light, heat, etc.; primary and secondary plasticizers such as butyl benzyl phthalate, dioctyl phthalate and dodecyl benzene respectively; pigments and fillers, such as titanium dioxide and calcium carbonate; and other conventional and well-known additives.

Although a medium molecular weight polymer or a co-polymer of vinyl chloride is the preferred synthetic resin to be incorporated in the foamable resinous polymer composition, many other synthetic resins of appropriate molecular weights are equally utilizable. Many of such other suitable synthetic resins are set forth in the previous mentioned U.S. Patents cited herein and reference thereto are incorporated herein. Azodicarbonamide is indicated as the preferred blowing or foaming agent, but many other equivalent blowing and foaming agents are also applicable to the principles of the present invention. Many of such other blowing and foaming agents are also set forth in the United States Patents cited herein and reference thereto are incorporated herein. Similarly, many other accelerators, catalysts, viscosity modifiers, light and heat stabilizers, UV absorbers, plasticizers, pigments, antioxidants, bacteriostats and bacteriocides, and other additives may be included in the resinous polymer composition. The specific nature and the particular physical and chemical characteristics as well as the properties of the various constituents of the foamable resinous composition do not relate to the essence or critical features of the present invention and further specific elaboration is not believed necessary.

The foamable resinous composition is applied to the backing sheet material 11 substantially uniformly by reverse roll coating, knife coating, air knife, flexible blade or by other procedures known in the industry. The thickness of the applied foamable resinous composition is dependent upon the specifications of the surface covering to be manufactured; normally the range is between 7 and 30 mils of wet application.

After coating of the backing sheet material 11 with the foamable resinous composition layer, the combination is heated in an oven for a period of time at a temperature sufficient to gel the foamable resinous composition but not sufficiently high enough to activate or to decompose the blowing or foaming agent present in the foamable resinous composition. Such layer is then cooled forming a pre-gel 13, which together with the backing sheet material 11 forms a base layer, generally indicated as 14.

The base layer 14 may then be printed with printing ink compositions as indicated as 15 in FIG. 2, in a desired design and with the desired colors. Techniques to accomplish this include direct or indirect rotogravure printing, offset printing, flexographics or screen printing. For chemical embossing, at least one of the printing ink compositions 15 contain a blowing agent modifier which applied to the pre-gel 13 and after total processing cause differential blowing in those areas of a pre-gel 13, yielding a desired textural effect. The printing ink composition containing the blowing agent modifier indicated as 17 in FIGS. 2 and 3.

Typical well-known and conventional printing ink compositions 15 with and without blowing agent modifiers are to be noted in the United States Patents cited herein and further specific elaboration thereof is not believed necessary or required.

After the base layer 14 is printed with the printing ink compositions 15 and 17 forming the first printed pattern layer, generally indicated as 19 the composite is dried in an oven and is then ready for application thereto of a first wearlayer plastisol composition which after required heating will become a first wearlayer 21. Normally, the first wearlayer plastisol composition is applied wet in the range of from 5 to 25 mils, preferably 10 to 15 mils for maximum visual effect.

The first wearlayer plastisol composition is formulated from a synthetic resin, such as a polymer or a copolymer of vinyl chloride, preferably a high molecular weight polyvinyl chloride, to which synthetic resin is added well-known and conventional agents, such as plasticizers, light and heat stabilizers, UV absorbers, solvents, etc. Such constituents are similar to the constituents found in the foamable resinous composition, except that blowing agents or opaque materials are not included in the formulation. After the first wearlayer plastisol composition is heated and fused to the pre-gel 13, at a temperature insufficient to cause blowing of the foamable resinous composition, there is formed a translucent or transparent, first wearlayer 21. The wearlayer 21 is then cooled in preparation for printing with a second pigmented ink composition 23.

The techniques of printing on the first wearlayer 21 are the same as previously described for printing on the base layer 14. The pigmented ink compositions 23 can be applied in an overall pattern on the first wearlayer 19 or they can be applied in registration with the design of the first printed layer 19 applied on the base layer 14. The pigmented inks 23 contain pigment bases including nacreous or pearlescent particles, metallic flakes or the like. The inclusion of any particular pigment base is dependent on the desired effect.

Following application and drying of the pigmented ink compositions 23 forming a second printed pattern layer 25, a second wearlayer plastisol composition is applied to the resulting composite in a like manner as previously hereinabove described. The formulation of the second wearlayer composition is similar to that composition that forms the first wearlayer 19. Wet application of the second wearlayer plastisol composition is at a thickness in the range of from 5 to 20 mils. To obtain maximum visual effect a thickness of from 10 to 15 mils of wearlayer composition is preferably applied resulting in maximum clarity and thereby exhibiting a sense of depth.

Following application of the second wearlayer plastisol composition, the multi-layer assembly comprising the backing sheet material 11, the pre-gel 13, the first printed pattern layer 19 which may selectively comprise a blowing agent modifier in one or more of the desired printed portions, the first wearlayer 21, which is a translucent or transparent, the second printed pattern layer 25 and the second wearlayer plastisol composition is then heated to an elevated temperature sufficient to fuse both the pre-gel 13 and the first wearlayer 21 to the second wearlayer plastisol composition forming the second wearlayer 27, which is also a transparent or translucent sheet. Further heating at appropriate temperatures activates the blowing or foaming agent in the pre-gel 13 to initiate the blowing or foaming action. The temperature of the entire mass must reach the fusion temperature of the resins in order to obtain a product of maximum strength. Using a preferred vinyl chloride polymer or co-polymer, fusion is attained at a temperature of from about 325° F. to about 450° F. to produce a final product 29, as illustrated in FIG. 3. If modifiers for blowing agent were not incorporated in the first printing ink composition 15 or 17 and embossing and texturing is required this can be accomplished by mechanical techniques.

Although the present invention has been described with reference to techniques for chemical embossing, it is understood by one skilled in the art that the same visual effects are achieved by using rotary screen methods of printing. Rather than printing the desired designs with pigmented inks containing the desired decorative particles, the decorative particles may be selectively deposited by rotary screen technique using plastisol formulations containing the desired decorative particles and pigments after application of the first wearlayer and prior to the application of the second wearlayer. This screen printed decoration can be either randomly printed or printed in registration with the base pattern.

The following specific examples will further illustrate the embodiments of this invention. In these examples, all parts given are by weight.

EXAMPLE I

This example relates to the process of using the present invention with rotogravure printing techniques. The following are the formulations for practicing this technique.

| Formula No. 1 - Foamable Plastisol | |
|---|---|
| Polyvinylchloride Resin (Med. Mol Wt.) | 100.0 parts |
| Zinc Oxide | 1.5 parts |
| Azodicarbonamide | 2.5 parts |
| Dioctyl Phthalate | 55.0 parts |
| Dodecyl Benzene | 10.0 parts |
| Titanium Dioxide | 5.0 parts |
| Formula No. 2 - Clear Layer Formula | |
| Polyvinylchloride Resin (High Mol. Wt.) | 100.0 parts |
| Butyl Benzyl Phthalate | 40.0 parts |
| Dodecyl Benzene | 7.0 parts |
| Epoxidized Soya Oil | 5.0 parts |
| Stabilizer (Calcium/Zinc Phosphite) | 3.0 parts |

| | Rotogravure Ink Formulas | | |
|---|---|---|---|
| | No. A Regular | No. B Pearlescent | No. C Foam Retarder |
| Vinyl Chloride/Vinyl Acetate Co-polymer | 10 parts | 10 parts | 10 parts |
| Methyl Ethyl Ketone | 75 parts | 75 parts | 75 parts |
| Pigment Base | 15 parts | — | 15 parts |
| Fumaric Acid | — | — | 10 parts |
| Pearlescent Color | — | 10 parts | — |

Note: The concentration of pearlescent color can be varied from 2 to 25 parts, depending on the effect desired.

To a web of asbestos flooring felt, 0.030" thick, apply a uniform layer of foamable plastisol (Formula 1) 0.015" thick, using a rigid knife coater. Gel the coating by exposure in a hot air oven at an equivalent of 325° F. for one minute and cool to room temperature. Following this formation of a pre-gel, apply a first print design to the pre-gel using a rotogravure printer, and color vinyl inks (ink formula A). In areas where one desires foam retardation an ink (ink formula C) should be used. Following this procedure the inks should be dried.

Using a reverse roll coater, apply between 0.010"–0.015" of clear layer plastisol (Formula 2). Gel the clear layer plastisol by exposure in a hot air oven at 325° F. for one minute and cool to room temperature. Then apply a second printed pattern with a rotogravure printer, using inks containing pearlescent colorations (ink Formula C). The pearlescent ink should then be dried. Using a reverse roll coater, apply between 0.010"–0.015" of clear vinyl plastisol (Formula 2). Fuse the clear layers and foam the foamable plastisol by exposure in a hot air oven for four minutes at an average temperature of 400° F. Upon cooling one will have produced a product with the desired decorative effects.

EXAMPLE II

When using the process of the present invention with rotary screen printing the foamable plastisol and the clear layer formulas will be the same as in formulas 1 and 2. The change will be in the screen printing ink formulas which are:

|  | No. D Regular | No. E Pearlescent |
|---|---|---|
| Polyvinylchloride (high Mol. Wt). | 100.0 parts | 100.0 parts |
| Butyl Benzyl Phthalate | 40.0 parts | 40.0 parts |
| Dodecyl Benzene | 7.0 parts | 7.0 parts |
| Epoxidized Soya Oil | 5.0 parts | 5.0 parts |
| Stabilizer (Calcium/Zinc Phosphite) | 3.0 parts | 3.0 parts |
| Pigment Base | 15.0 parts | — |
| Pearlescent Color | — | 10.0 parts |

Note: The concentration of pearlescent color can be varied from two to 25 parts, depending on the effect desired.

To a web of asbestos flooring felt, 0.030" thick apply a uniform layer of foamable plastisol (Formula 1), 0.015" thick, using a rigid knife coater. Gel the coating by exposure in a hot air oven at an equivalent of 325° F. for one minute and cool to room temperature. Using a rotary screen printer, print a 5 mil thickness of screen printing plastisol inks (Formula D) in a desired pattern. If multiple screens are used, gel the printed plastisol ink by exposure in a hot air oven at 350° F. for 30 seconds, then cooling to room temperature before the next plastisol ink application.

Using a rigid knife coater, apply between 0.010"–0.015" of clear layer plastisol (Formula 2). Gel the clear plastisol by exposure in a hot air oven at an equivalent of 350° F. for one minute. Cool to room temperature.

Following cooling, print a 5 mil thickness of screen printing plastisol inks containing pearlescent colorations (Formula E) using a rotary screen printer. If multiple screens are used, gel the printed plastisol ink by exposure in a hot air oven at 350° F. for 30 seconds. Cool to room temperature before the next plastisol ink application.

Following the cooling, apply between 0.010"–0.015" of clear vinyl plastisol (Formula 2) with a rigid knife coater. Finally fuse the clear layers and foam the foamable plastisol by exposure in a hot air oven at an average of 400° F. for 4 minutes. Upon cooling one will produce a product with the desired effects.

Numerous modifications and variations of the above disclosed invention are possible in light of the above teachings and therefore, within the scope of the appended claims the invention may be practiced otherwise than as particularly described.

What is claimed:

1. A surface covering, which comprises:
    (a) a backing sheet material;
    (b) an expanded resinous layer disposed on said backing sheet material;
    (c) a first printed design on said expanded resinous layer;
    (d) a first substantially translucent or transparent layer overlying said first printed design;
    (e) a second printed design of an ink containing decorative particles selectively deposited on said first substantially translucent or transparent layer; and
    (f) a second substantially translucent layer overlying said second printed design.

2. The surface covering as defined in claim 1 wherein said decorative particles are pearlescent or nacreous pigments.

3. The surface covering as defined in claim 1 wherein said decorative particles are metallic flakes.

4. The surface covering as defined in claims 1, 2 or 3 wherein said first layer is of a thickness of from 5 to 25 mils.

5. The surface covering as defined in claim 4 wherein said first layer is of a preferred thickness of from 10 to 15 mils.

6. The surface covering as defined in claim 5 wherein said second layer is of a thickness of from 5 to 20 mils.

7. The surface covering as defined in claim 6 wherein said second layer is of a preferred thickness of from 10 to 15 mils.

* * * * *